United States Patent [19]

Ikenaka et al.

[11] Patent Number: 5,205,390
[45] Date of Patent: Apr. 27, 1993

[54] STOCK SEPARATING APPARATUS

[75] Inventors: Masahiro Ikenaka; Kunihiko Tanaka, both of Komatsu, Japan

[73] Assignee: Kabushiki Kaisha Komatsu Seisakusho, Tokyo, Japan

[21] Appl. No.: 525,170
[22] PCT Filed: Sep. 19, 1989
[86] PCT No.: PCT/JP89/00948
 § 371 Date: Jul. 16, 1991
 § 102(e) Date: Jul. 16, 1991
[87] PCT Pub. No.: WO90/03234
 PCT Pub. Date: Apr. 5, 1990

[30] Foreign Application Priority Data

Sep. 20, 1988 [JP] Japan ............................ 63-122089

[51] Int. Cl.⁵ .............................................. B65G 11/00
[52] U.S. Cl. ...................................... 193/2 R; 221/242
[58] Field of Search .................. 193/2 R, 2 C, 33, 34; 198/535, 536; 221/242

[56] References Cited

U.S. PATENT DOCUMENTS 3,057,515 10/1962 Loeser ................... 221/242
3,757,998 9/1973 Millies et al. ........... 221/242

FOREIGN PATENT DOCUMENTS 3049073 9/1981 Fed. Rep. of Germany .
195837 12/1986 Japan .
5804 2/1987 Japan .

OTHER PUBLICATIONS

European Search Report, EP 89 91 0184, Jun. 18, 1991.

Primary Examiner—Joseph E. Valenza
Attorney, Agent, or Firm—Frost & Jacobs

[57] ABSTRACT

A stock separating apparatus which separates stocks that drop successively from a stock feed source through a chute and feeds them one by one to a working machine, for example, a forging press, the apparatus being capable of coping with a change in the size of stocks with ease and within a short time. The stock separating apparatus has an attachment (11) that is provided at the lower end of a chute (3), the attachment being replaceable in accordance with the size of stocks (2). A circularly curved lower chute (6) is provided at the lower end of the chute (3). The attachment (11) is detachably attached to an attachment holder (10) which is horizontally pivotably provided on a support member (12) that is secured to the apparatus body (1) through a bracket (4).

2 Claims, 4 Drawing Sheets

STOCK SEPARATING APPARATUS

TECHNICAL FIELD OF THE INVENTION

The present invention relates to a stock separating apparatus which separates a large number of stocks that drop successively from a stock feed source through a chute and feeds them one by one to a forging press, for example. More particularly, the present invention relates to a stock separating apparatus wherein an attachment which is replaceable in accordance with the size of stocks is provided at the lower end of the chute.

BACKGROUND ART OF THE INVENTION

To feed bar stocks to, for example, a forging press, a stock separating apparatus, which separates stocks that drop successively from a stock feed source through a chute and feeds them one by one into the forging press, has heretofore been used.

The above-described conventional stock separating apparatus has a tubular chute a, as shown in FIG. 1, and a separating member, which separates stocks b that drop successively through the chute a and feeds them one by one to, for example, a forging press, is provided at the lower end of the chute a. It should be noted that c denotes magnets.

In the conventional stock separating apparatus, however, when the size of stocks which are to be fed to a forging press or the like changes, if the chute a is not replaced with another which matches to the size of stocks to be fed, the positioning accuracy of stocks b to be fed is deteriorated due to, for example, a play between the chute a and the stocks b.

Accordingly, the conventional apparatus necessitates an operation of replacing the chute a every time the size of stocks b changes, and therefore requires a large number of man-hours for the replacing operation. In addition, since it is necessary to prepare a plurality of chutes which correspond to various sizes of stocks b, the conventional apparatus is uneconomical.

SUMMARY OF THE INVENTION

In view of the above-described circumstances, it is an object of the present invention to provide a stock separating apparatus which is capable of coping with a change of stocks having various sizes with ease and within a short time simply by replacing an attachment that is provided at the lower end of a chute.

To attain the above-described object, according to a first mode of the present invention, there is provided a stock separating apparatus which separates stocks that drop successively from a stock feed source through a chute and feeds them one by one to a working machine, for example, a forging press, wherein the improvement comprises an attachment that is provided at the lower end of the chute, the attachment being replaceable with ease and within a short time in accordance with the size of stocks.

According to a second mode of the present invention, there is provided the stock separating apparatus according to the above-described first mode, wherein a circularly curved lower chute is provided at the lower end of the chute, the attachment being provided at the lower end of the lower chute.

According to a third mode of the present invention, there is provided the stock separating apparatus according to either one of the above-described first and second modes, wherein the attachment is detachably attached to an attachment holder which is horizontally pivotably attached to the apparatus body through a bracket.

According to a fourth mode of the present invention, there is provided the stock separating apparatus according to the above-described second mode, wherein the lower chute is pivotable upwardly about a hinge to replace the attachment.

The present invention involving the above-described modes has the following advantages:

Even if the size of stocks changes variously, stocks can be positioned with high accuracy simply by replacing the attachment. It is therefore possible to reduce by a large margin the time and man-hours that are needed for setup in comparison with the conventional apparatus in which the whole chute is replaced evey time stocks are changed.

Since it is only necessary to replace the attachment, the economical efficiency is also increased by a large margin in comparison with the conventional apparatus in which the whole chute is replaced.

The above and other objects, modes and advantages of the present invention will become apparent to those skilled in the art from the following description of preferred embodiments which are conformable to the principle of the present invention, taken in conjunction with the accompanying drawings.

DETAILED DESCRIPTION OF PREFERRED EMBODIMENTS

Two preferred embodiments of the present invention will be described below in conjunction with FIGS. 2 to 7 in the accompanying drawings.

Figure 1:
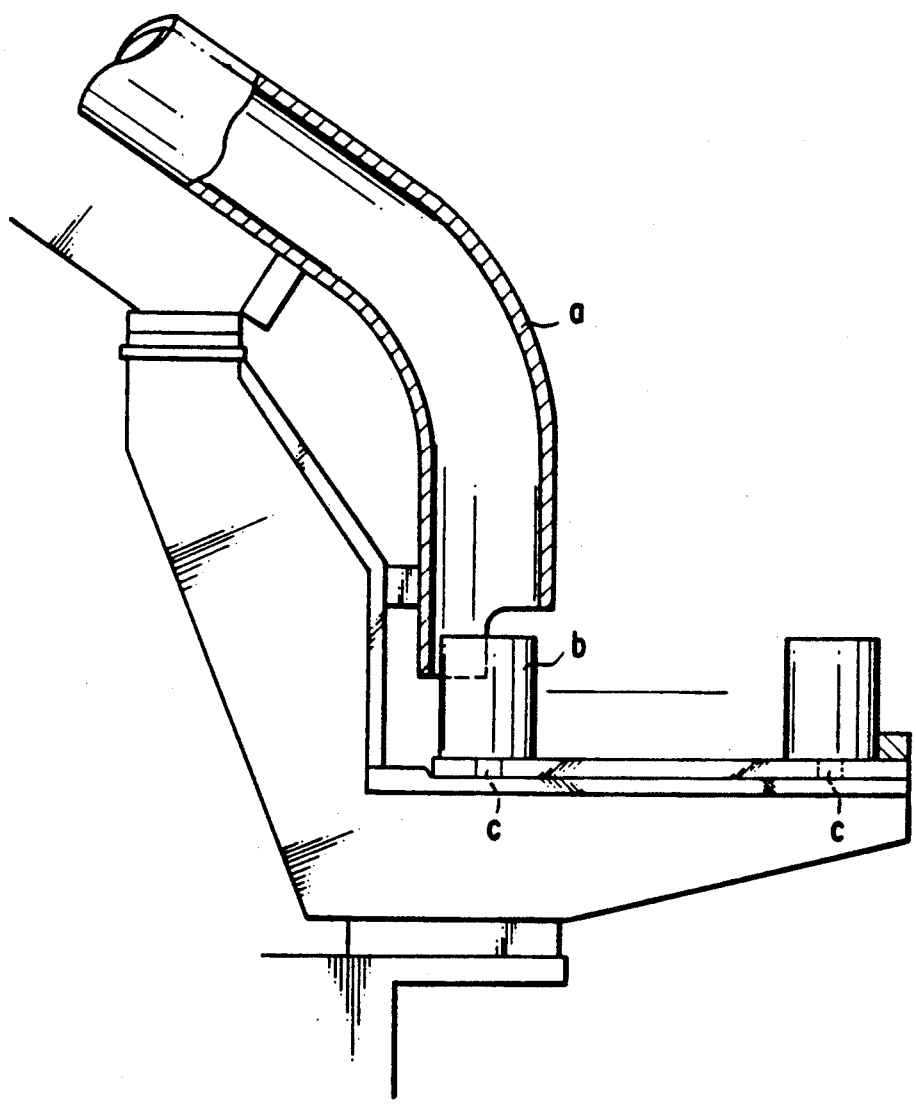
FIG. 1 is a partly-sectioned fragmentary side view of a conventional stock separating apparatus.
Figure 2:
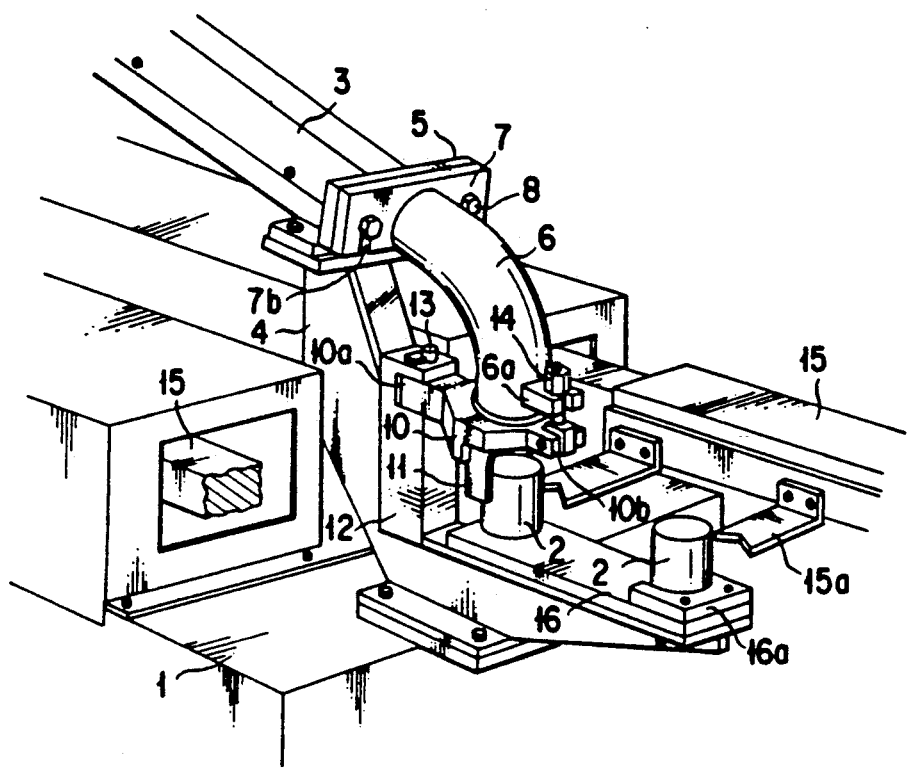
FIG. 2 is a fragmentary perspective view of one embodiment of the present invention.

A first embodiment will first be described in conjunction with FIGS. 2 to 4.

In these figures, reference numeral 1 denotes the body of the apparatus. A chute 3 through which bar stocks 2 drop successively is provided at the upper side of the apparatus body 1.

At the lower end of the chute 3 is provided a mounting plate 5 which is supported by a bracket 4. A mounting plate 7, which is secured to one end of a lower chute 6, is detachably attached to the mounting plate 5 by means of securing members 8.

An annular projection 5b is provided around the periphery of an opening 5a in the mounting plate 5 that is secured to the chute 3. The annular projection 5b fits into an annular recess 7a in the mounting plate 7 that is secured to the upper end of the lower chute 6, thereby enabling the chute 3 and the lower chute 6 to be aligned with each ther. In addition, notches 7b are formed at both sides of the annular recess 7a, the notches 7b extending from one edge of the mounting plate 7. With the notches 7b being engaged with the securing members 8 that are screwed into the mounting plate 5, the securing members 8 are tightened, thereby enabling the lower chute 6 to be detachably attached to the chute 3.

The lower chute 6 is circularly curved and arranged such that an attachment 11 can be connected to the lower end portion thereof through an attachment holder 10.

Figure 3:
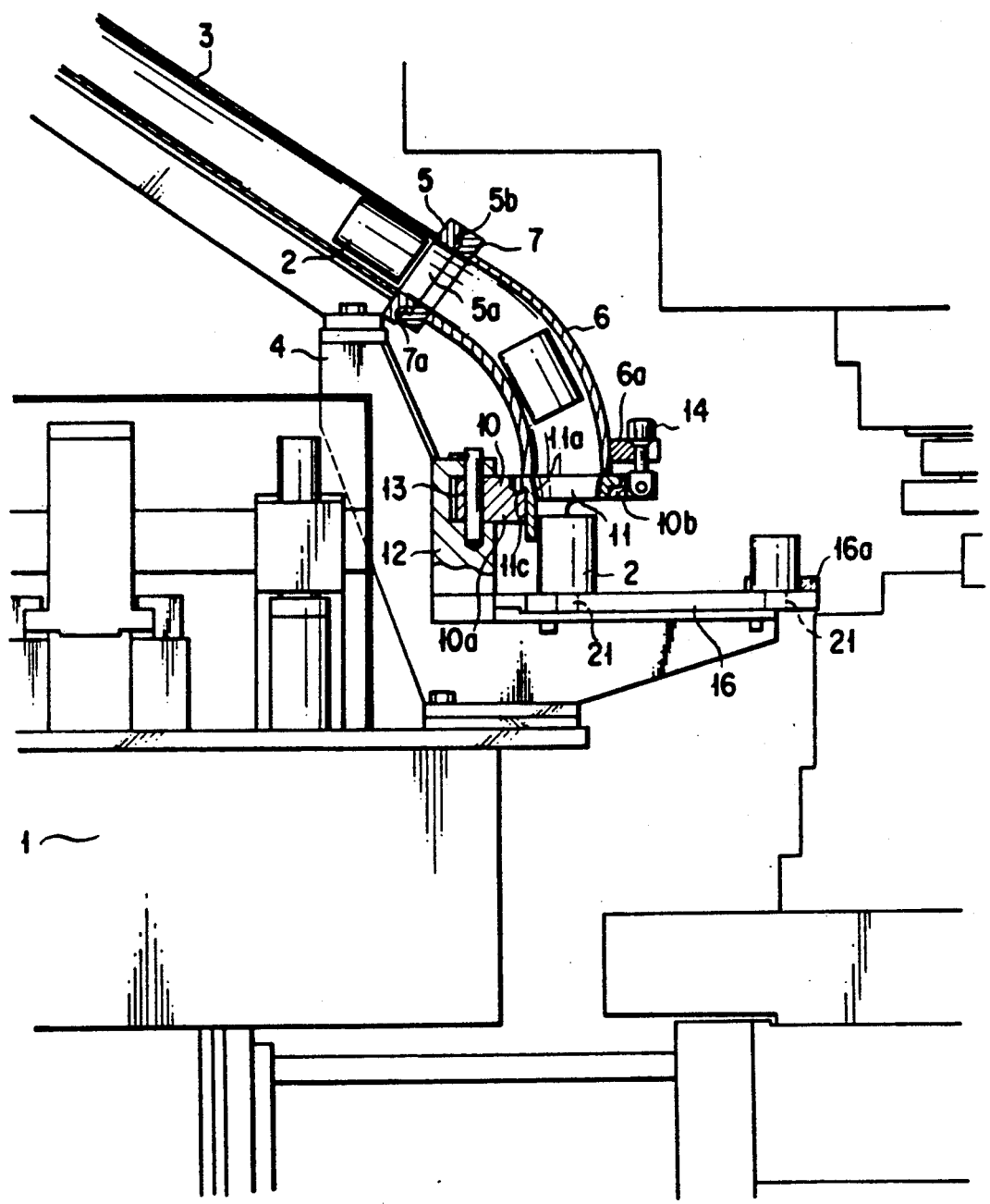
FIG. 3 is a partly-sectioned fragmentary side view of the embodiment illustrated in FIG. 2.

The attachment holder 10 has a projection 10a which is provided on the outer peripheral portion thereof, as shown in FIG. 3. The projection 10a is supported through a vertical pin 13 on a support member 12 that is secured to the bracket 4 so that the attachment 10 is located at the lower side of the lower chute 6. Thus, the attachment holder 10 is pivotable about the vertical pin 13. The attachment holder 10 further has a projection 10b which is provided on the outer peripheral surface thereof opposite to the projection 10a. The attachment holder 10 can be secured to the lower end of the lower chute 6 by engaging a setscrew 14, which is pivotably provided on the projection 10b, with a hook 6a (see FIG. 4) that is provided on the lower end portion of the lower chute 6, and then tightening the setscrew 14.

It should be noted that reference numeral 11c in the figure (see FIG. 3) denotes a knock pin which prevents rotation of the attachment 11.

Meantime, the attachment holder 10 is provided with a circular bore 10c so that the attachment 11 can detachably fit into the bore 10c from above it.

A plurality of different kinds of attachment 11 which have different inner diameters are prepared in accordance with various sizes of stocks 2. Each attachment 11 has a tapered portion 11a which is formed at the upper part of the inner periphery thereof so that stocks 2 can drop into the attachment 11 without being caught even if the inner diameter of the attachment 11 is smaller than the inner diameter of the lower chute 6.

Figure 4:
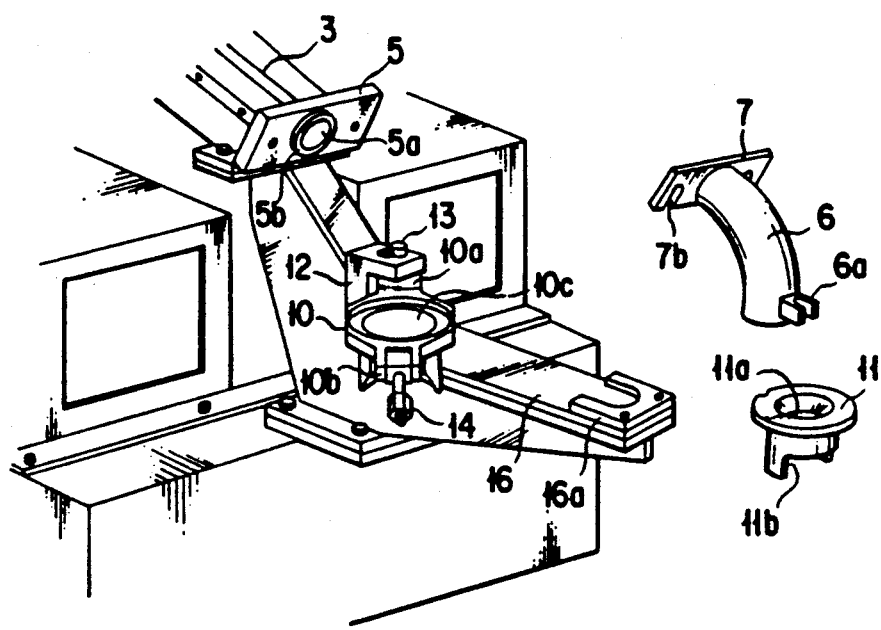
FIG. 4 is a fragmentary view of the embodiment illustrated in FIG. 2, showing an essential part thereof in an exploded view.

As will be clear from FIG. 4, the lower part of the attachment 11 is provided with a cut portion 11b through which stocks 2 can pass, so that a stock 2 within the attachment 11 is moved by separating members 15 to a stock takeout position which is defined by a positioning plate 16a that is secured to the distal end of a feed plate 16. It should be noted that the positioning plate 16a is screwed to the feed plate 16 so that it is replaceable in accordance with the size of stocks 2.

The separating members 15 comprise a pair bars which are parallel to each other. The separating members 15 are driven in the feed direction and the clamp direction by a driving mechanism (not shown). In addition, fingers 15a are provided on the opposing surfaces of the separating members 15 so that a stock 2 which is clamped between a pair of opposing fingers 15a is moved from the inside of the attachment 11 to a position where it abuts against the positioning plate 16a that is provided at the distal end of the feed plate 16. It should be noted that reference numeral 21 in FIG. 3 denotes magnets which are buried in the feed plate 16.

The function will next be explained. To separate stocks 2 that drop successively through the chute 3 and feed them one by one to, for example, a forging press, an attachment 11 which matches to the size of the stocks 2 is selected, and the selected attachment 11 is fitted into the circular bore 10c in the attachment holder 10. Then, the setscrew 14 on the attachment holder 11 is engaged with the hook 6a of the lower chute 6, thereby connecting the attachment 11 to the lower end of the lower chute 6.

In this state, the stocks 2 are fed into the chute 3. In consequence, each stock 2 drops by its own weight through the chute 3 to reach the lower chute 6 and further drops through the attachment 11 that is provided at the lower end of the lower chute 6.

Since an attachment 11 which matches to the size of the stocks 2 has previously been selected, the stock 2 that drops through the attachment 11 is positioned with high accuracy.

The stock 2 is then clamped by the fingers 15a of the separating members 15 and moved on the feed plate 16 until it abuts against the positioning plate 16a.

The above-described operation is repeated to separate stocks 2 that drop successively through the chute 3 and feed them one by one into, for example, a forging press, by the operation of a stock feed device (not shown) which is provided on the forging press.

Figure 5:
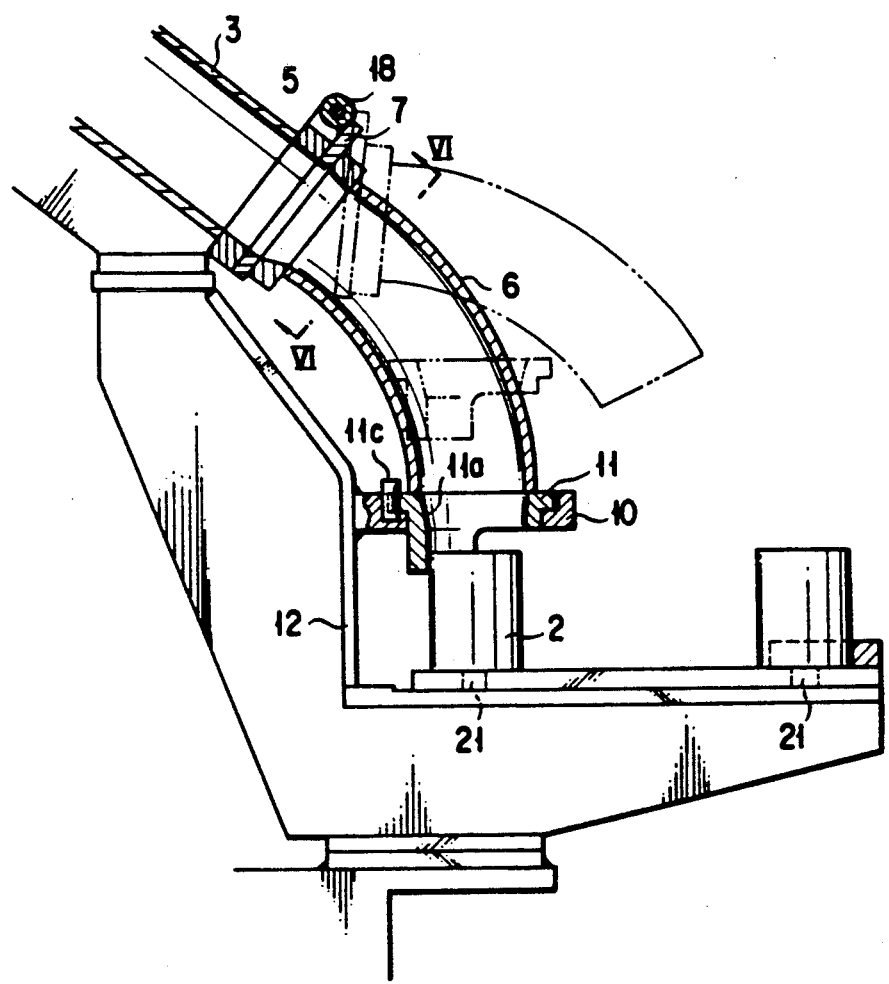
FIG. 5 is a partly-sectioned fragmentary side view of another embodiment of the present invention.
Figure 6:
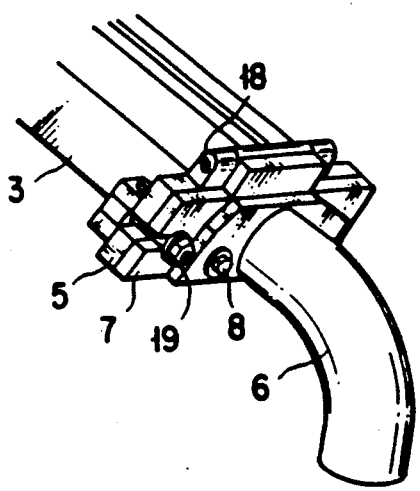
FIGS. 6 and 7 are perspective and front views, respectively, showing the hinge portion of the embodiment illustrated in FIG. 5.
Figure 7:
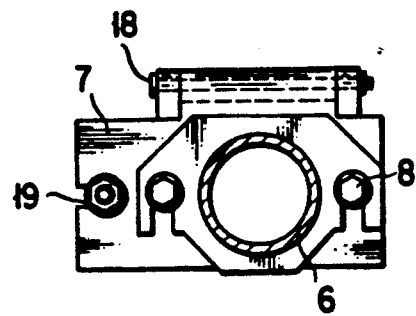

FIGS. 5 to 7 show in combination a second embodiment of the present invention. The second embodiment will next be explained. The mounting plate 5 that is provided at the lower end of the chute 3 and the upper portion of the mounting plate 7 that is provided on the lower chute 6 are coupled together by a hinge 18 so that the lower chute 6 is capable of pivoting upwardly about the hinge 18. The attachment holder 10 is secured to the support member 12.

In this state, the stocks 2 are fed into the chute 3. In consequence, each stock 2 drops by its own weight through the chute 3 to reach the lower chute 6 and further drops through the attachment 11 that is provided at the lower end of the lower chute 6.

Since an attachment 11 which matches to the size of the stocks 2 has previously been selected, the stock 2 that drops through the attachment 11 is positioned with high accuracy.

The stock 2 is then clamped by the fingers 15a of the separating members 15 and moved on the feed plate 16 until it abuts against the positioning plate 16a.

The above-described operation is repeated to separate stocks 2 that drop successively through the chute 3 and feed them one by one into, for example, a forging press, by the operation of a stock feed device (not shown) which is provided on the forging press.

FIGS. 5 to 7 show in combination a second embodiment of the present invention. The second embodiment will next be explained. The mounting plate 5 that is provided at the lower end of the chute 3 and the upper portion of the mounting plate 7 that is provided on the lower chute 6 are coupled together by a hinge 18 so that the lower chute 6 is capable of pivoting upwardly about the hinge 18. The attachment holder 10 is secured to the support member 12. When the attachment 11 is to be replaced, with a clamping bolt 19 removed, the lower chute 6 is pivoted upwardly about the hinge 18, thereby enabling replacement of the attachment 11. The function during an operation is the same as that in the above-described first embodiment.

What is claimed is:

1. In a stock separating apparatus which separates articles that drop successively from a stock feed source through an upper chute and feeds them one by one to a working machine, wherein the improvement comprises means for mounting said upper chute provided at a lower end of said upper chute, a circularly curved lower chute provided at said lower end of said upper chute, an attachment provided at the lower end of said lower chute, said attachment being detachably mounted to an attachment holder which is horizontally pivotally secured to the body of the apparatus via a bracket, said attachment being provided with a hole through which said articles pass, wherein the attachment is replaceable with ease and within a short time period, in accordance with varying sizes of said articles.

2. In a stock separating apparatus which separates articles that drop successively from a stock feed source through an upper chute and feeds them one by one to a working machine, wherein the improvement comprises means for mounting said upper chute provided at a lower end of said upper chute, a circularly curved lower chute provided at said lower end of said upper chute, an attachment provided at the lower end of said lower chute, said attachment being detachably mounted to an attachment holder which is provided with a hole through which said articles pass, said lower chute being pivotable upwardly about a hinge to replace said attachment, wherein the attachment is replaceable with ease and within a short time period in accordance with varying sizes of said articles.

* * * * *